Aug. 21, 1956  J. F. McKEE ET AL  2,759,226
DOOR FOR AIRPLANE HANGARS AND THE LIKE
Filed Feb. 7, 1952  9 Sheets-Sheet 1

Inventors.
John F. McKee
Melvin E. Hartzler
Robert K. Young
Carmen L. Ramirez &
Ralph D. George
By:-
Mann, Brown & Hansmann
Attys.

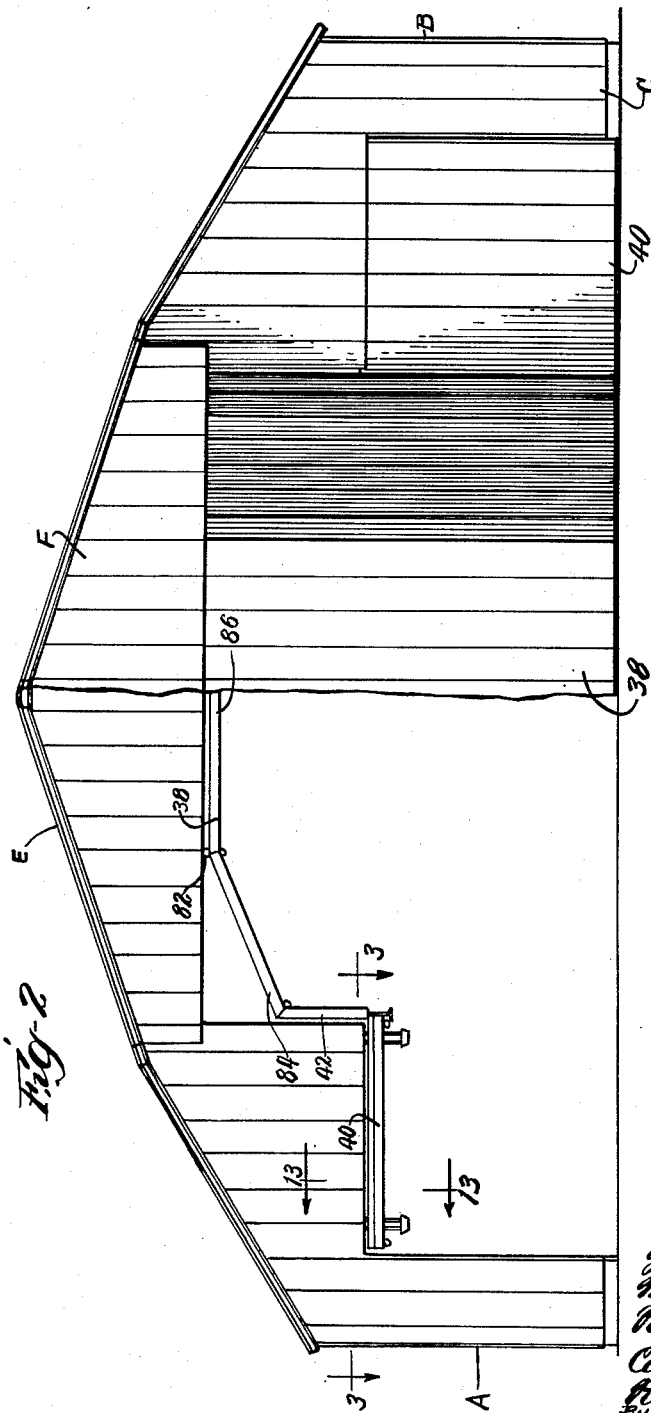

Aug. 21, 1956   J. F. McKEE ET AL   2,759,226
DOOR FOR AIRPLANE HANGARS AND THE LIKE
Filed Feb. 7, 1952   9 Sheets-Sheet 3
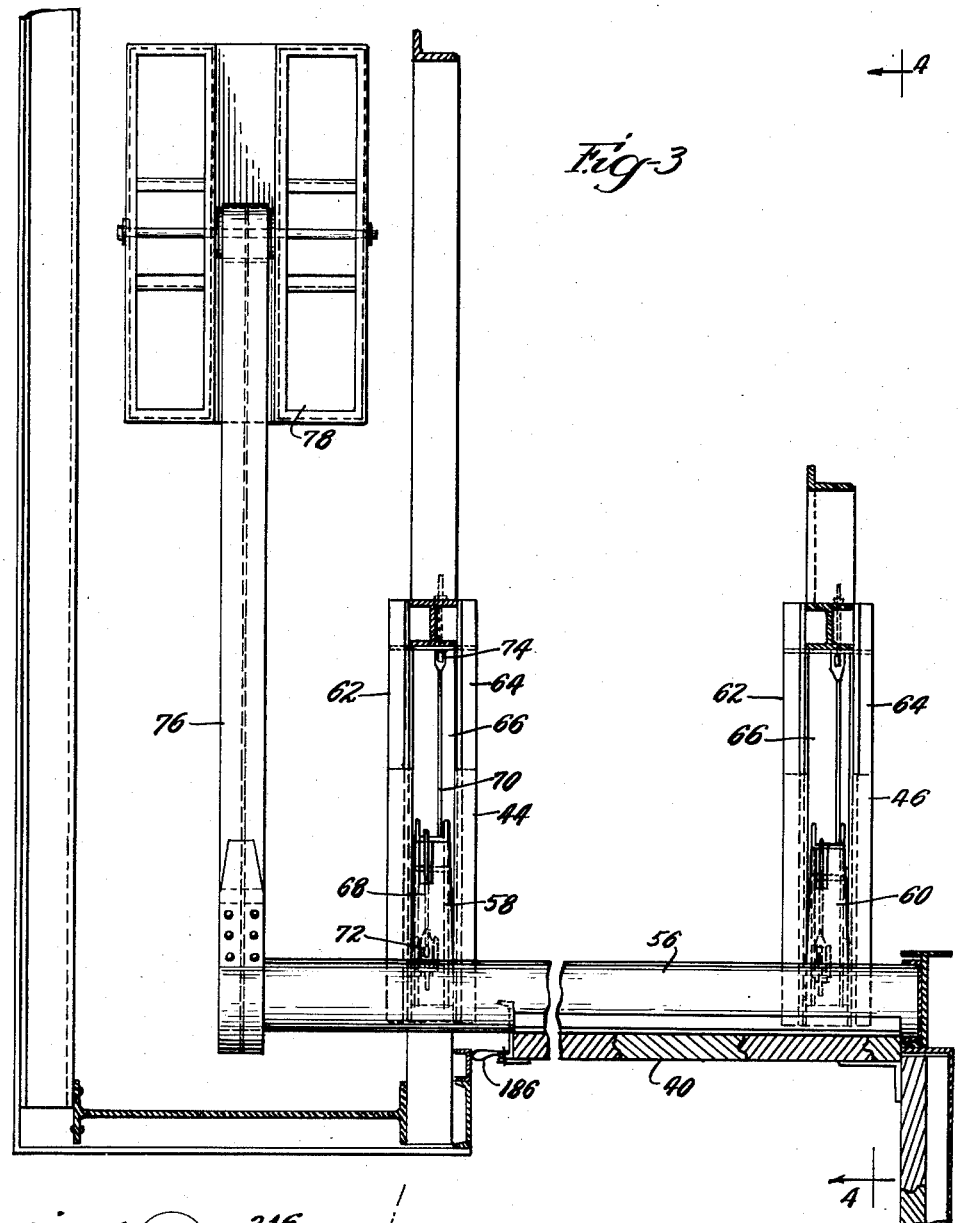
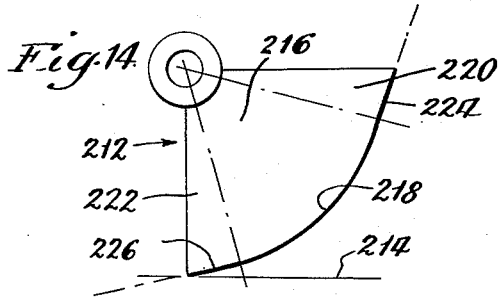

Aug. 21, 1956     J. F. McKEE ET AL     2,759,226
DOOR FOR AIRPLANE HANGARS AND THE LIKE
Filed Feb. 7, 1952     9 Sheets-Sheet 4
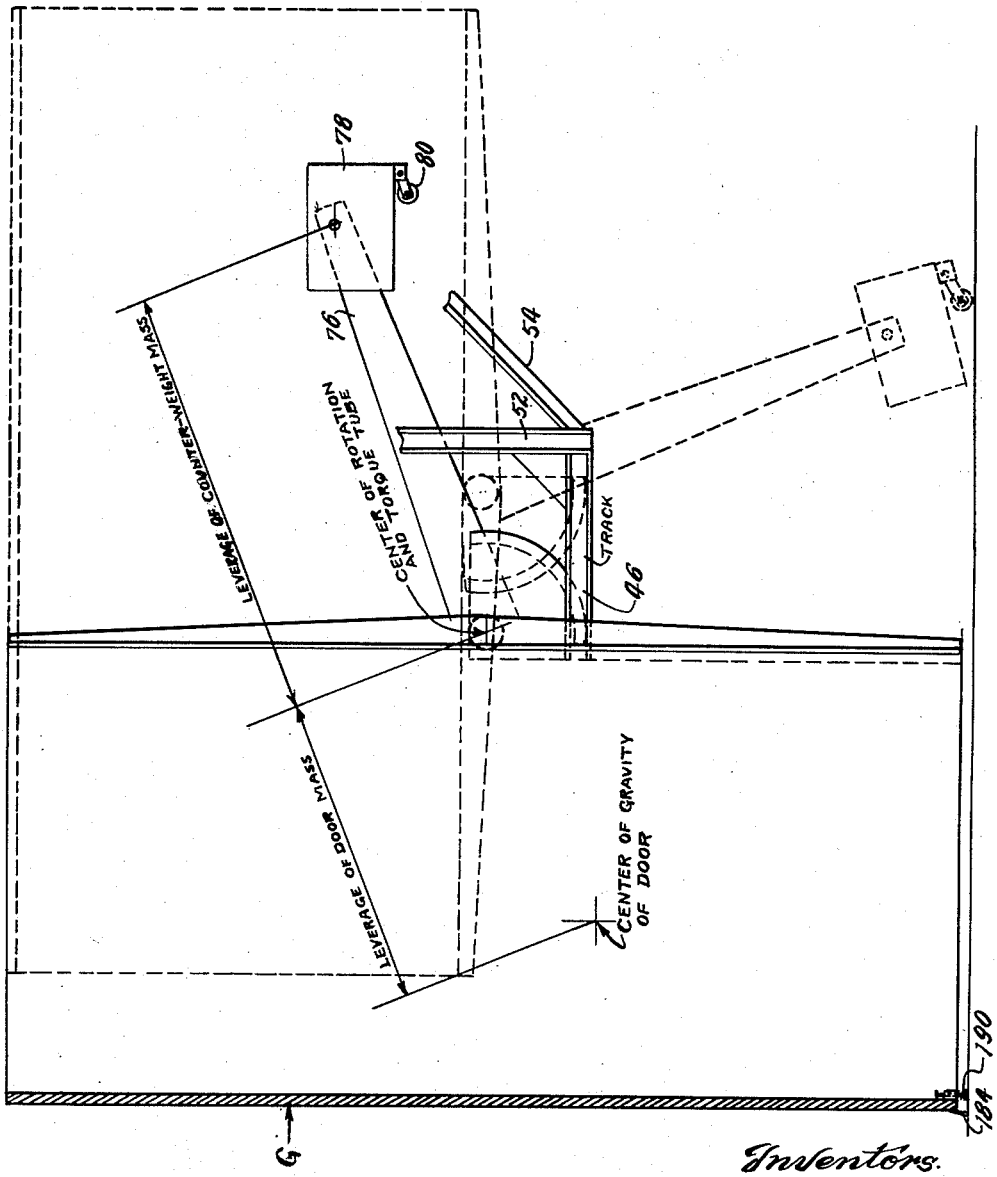

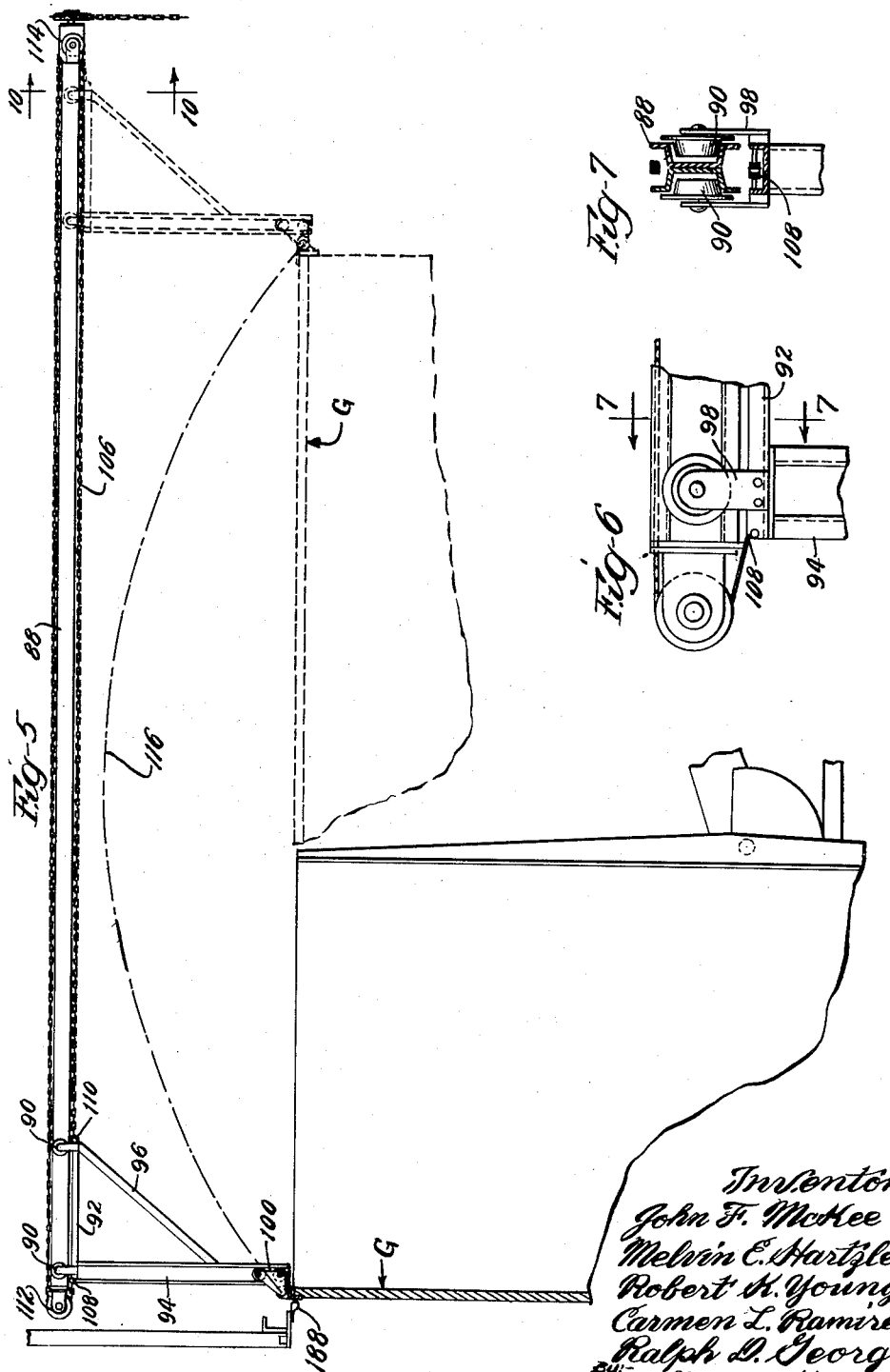

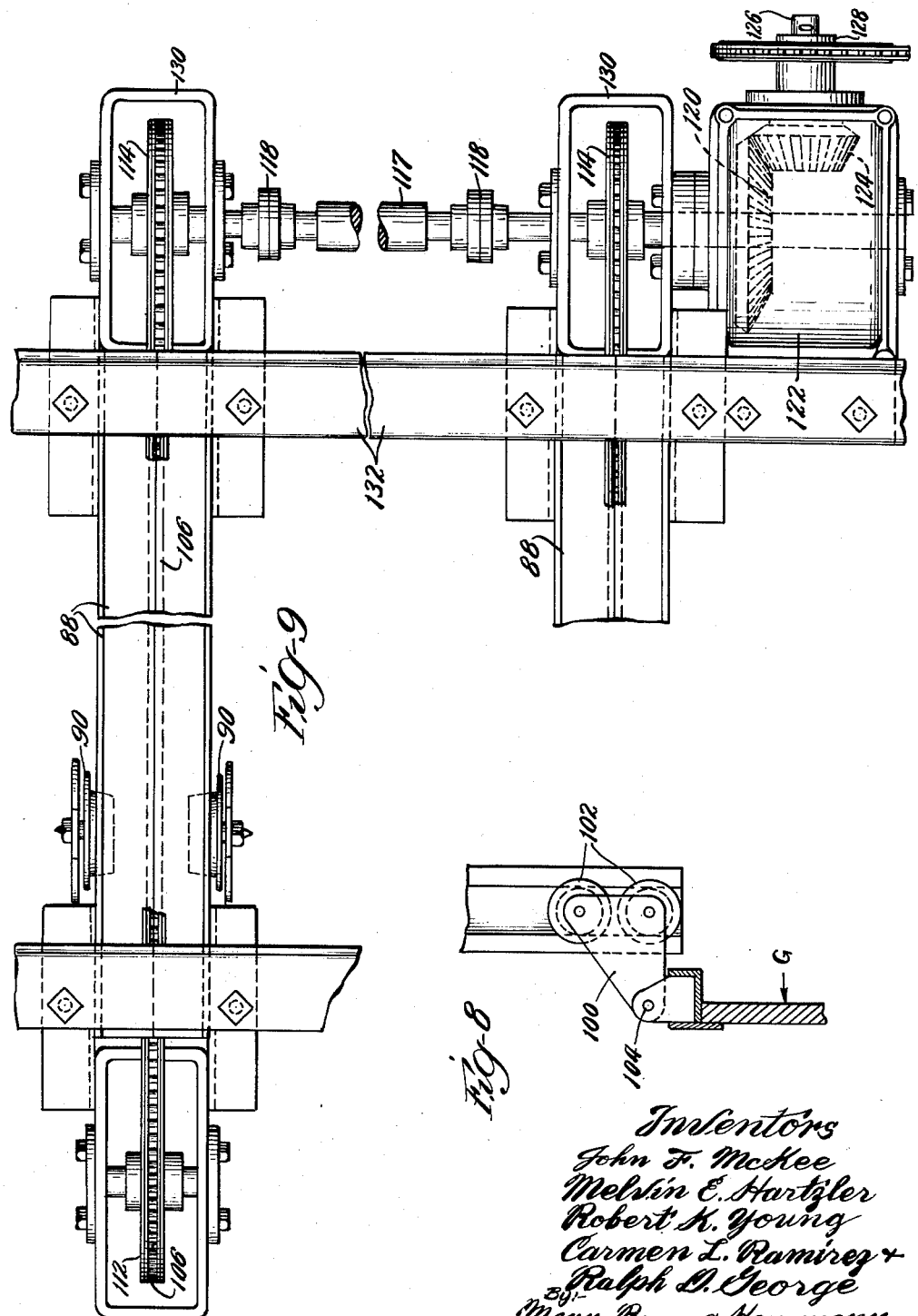

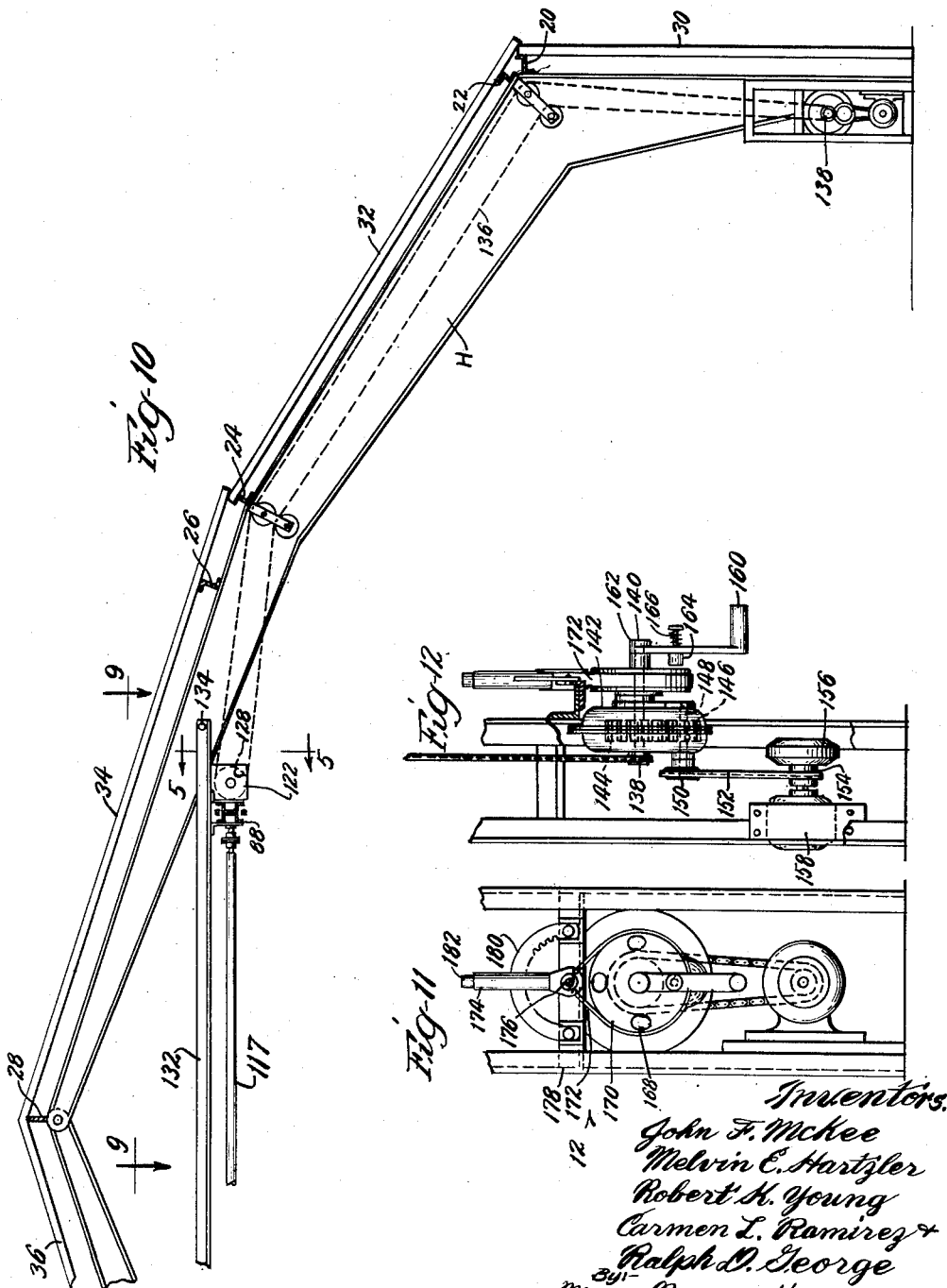

Aug. 21, 1956  J. F. McKEE ET AL  2,759,226
DOOR FOR AIRPLANE HANGARS AND THE LIKE
Filed Feb. 7, 1952  9 Sheets-Sheet 8
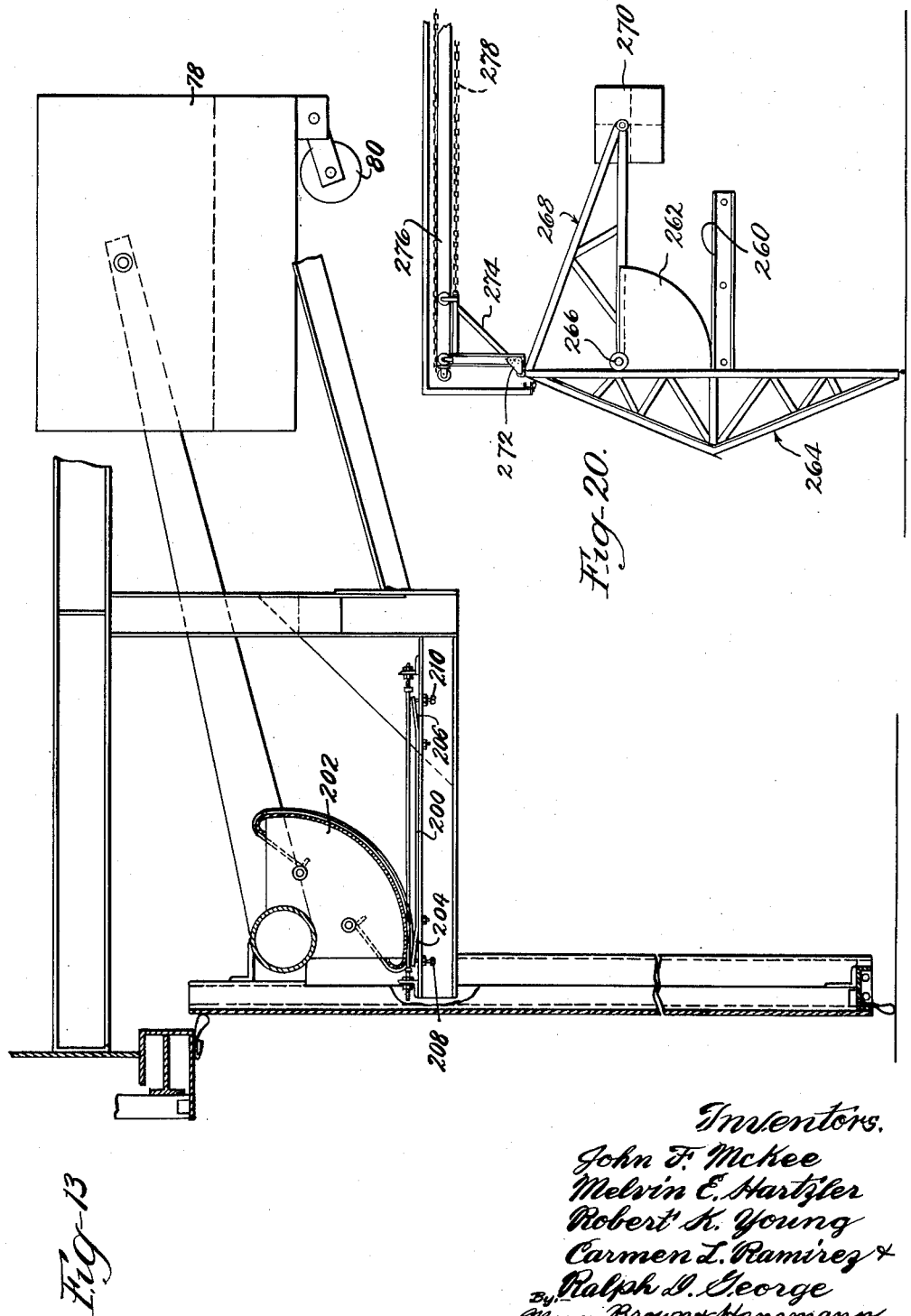
Inventors.
John F. McKee
Melvin E. Hartzler
Robert K. Young
Carmen L. Ramirez &
By Ralph D. George
Mann, Brown & Hansmann
Attys.

Aug. 21, 1956  J. F. McKEE ET AL  2,759,226
DOOR FOR AIRPLANE HANGARS AND THE LIKE
Filed Feb. 7, 1952  9 Sheets-Sheet 9
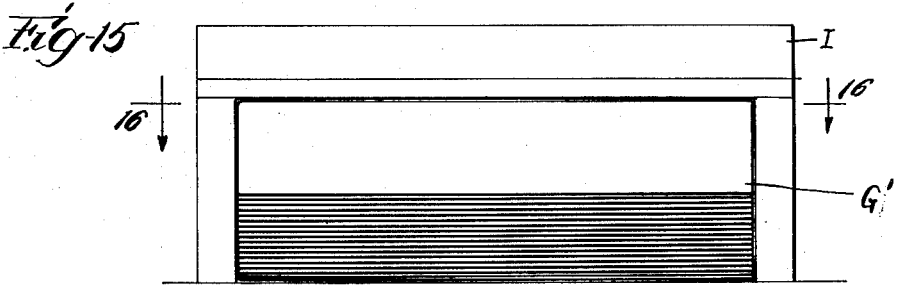
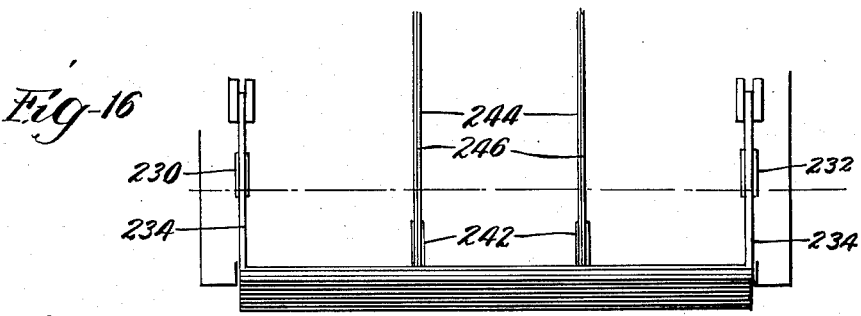
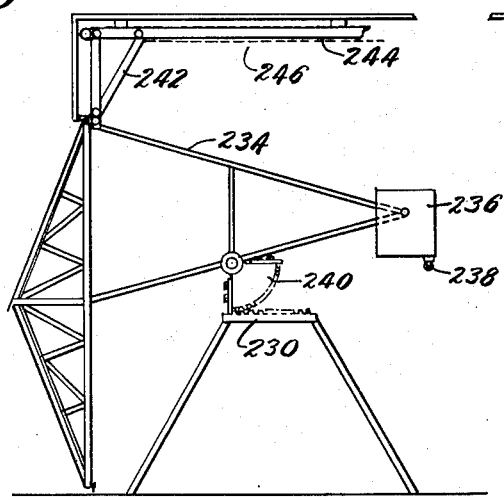
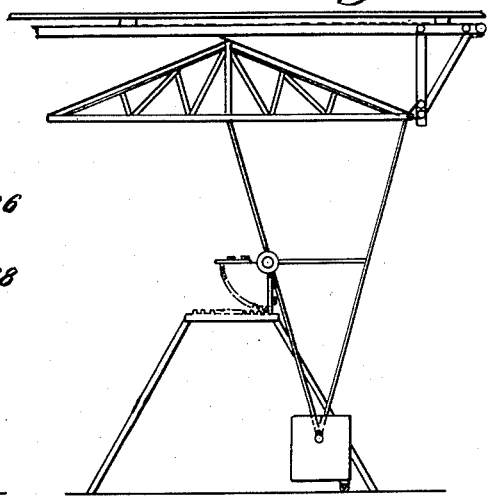
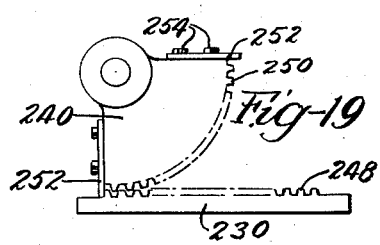
Inventors.
John F. McKee
Melvin E. Hartzler
Robert K. Young
Carmen L. Ramirez &
Ralph D. George
By Mann, Brown & Hansmann
Attys.

United States Patent Office 2,759,226
Patented Aug. 21, 1956

2,759,226

DOOR FOR AIRPLANE HANGARS AND THE LIKE

John F. McKee, Aurora, and Melvin E. Hartzler, Downers Grove, Ill., and Robert K. Young and Carmen L. Ramirez, Kansas City, and Ralph D. George, Raytown, Mo., assignors, by direct and mesne assignments, to McKee Door Company, Aurora, Ill., a corporation of Illinois Application February 7, 1952, Serial No. 270,432

19 Claims. (Cl. 20—16)

Our invention relates to airplane hangars and doors therefore, as well as to other buildings and doors designed and constructed to meet requirements similar to those of airplane hangars.

An object of our invention is to provide a new and improved airplane hangar and door construction.

Another object of our invention is to provide a new and improved hangar door which is in balance at all times and which requires a minimum of effort or power to open and close the door.

Another object is to provide a new and improved hangar door which may be operated more quickly than the doors heretofore known.

Another object is to provide a new and improved door which is lighter and less expensive than corresponding doors of the prior art.

Another object is to provide a hangar door having a new and improved mounting.

Another object is to provide a hangar door having new and improved balancing means.

Another object is to provide a hangar door having new and improved operating means.

Another object is to provide a hangar door having novel operating means whereby the door may be safely operated either by hand or an electric motor.

Another object is to provide a hangar door having new and improved means for facilitating starting and stopping.

Other objects and advantages will become apparent as the description proceeds.

In the drawings:

Fig. 2 is a composite front elevational view of the hangar shown in Fig. 1, wherein the left half shows the door in raised position and the right half shows the door in lowered or closed position;

Fig. 3 is a partial horizontal section on the line 3—3 of Fig. 2, with the door shown in closed position, illustrating the door-mounting means on an enlarged scale;

Fig. 4 is a partial vertical section taken on the line 4—4 of Fig. 3 and showing somewhat diagrammatically the mounting and counterbalancing of the door;

Fig. 5 is a longitudinal, vertical sectional view taken on the plane of the lines 5—5 of Fig. 10 and showing one of the reciprocable carriages and associated mechanism for opening and closing the door;

Fig. 6 is a side elevational view on an enlarged scale of the upper forward end of a door-operating carriage;

Fig. 7 is a vertical sectional view taken on the line 7—7 of Fig. 6;

Fig. 8 is an enlarged side elevational view of the trolley which is associated with each of the door-operating carriages;

Fig. 9 is a horizontal sectional view taken in the plane of line 9—9 of Fig. 10 showing the carriage-operating mechanism on an enlarged scale;

Fig. 10 is a partial transverse sectional view of the hangar taken in the plane of the lines 10—10 of Fig. 5 and showing the power source and intermediate connections for the driving mechanism of Fig. 9;

Fig. 11 is an enlarged view of the opposite side of the motor and motor control shown in the lower right-hand corner of Fig. 10;

Fig. 12 is a view of the mechanism of Fig. 11 looking in the direction of the arrow 12;

Fig. 13 is a view taken in the plane indicated by the line 13—13 of Fig. 2 but showing a modified form;

Fig. 14 is an enlarged side elevational view of a modified form of door mounting;

Fig. 15 is a front elevation of a building having a rectangular door and door opening;

Fig. 16 is a horizontal sectional view taken on the line 16—16 of Fig. 15;

Fig. 17 is a diagrammatic view of the door of Figs. 15 and 16 in closed position;

Fig. 18 is a view similar to Fig. 17 but showing the door in open position;

Fig. 19 is an enlarged side elevational view of the door mounting; and

Fig. 20 is a view similar to Fig. 17, but showing a further modification.

Figure 1:
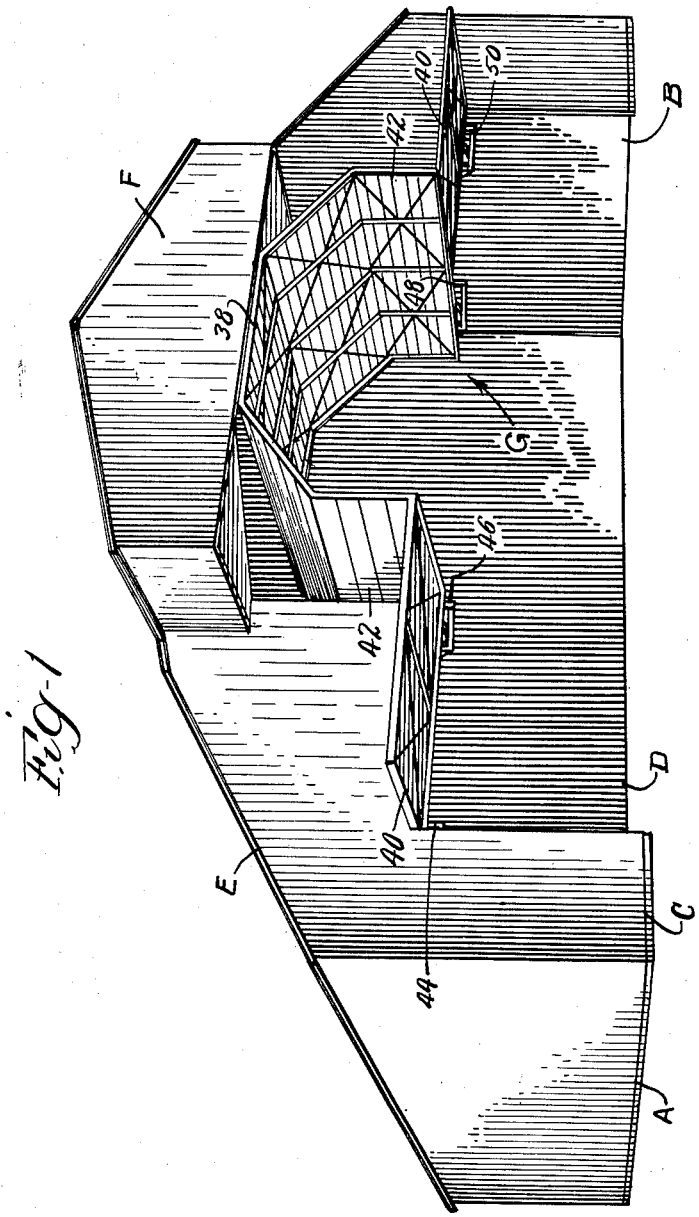
Fig. 1 is a perspective view of a hangar embodying one form of our invention and showing the door in raised position.

In Figs. 1 and 2 we have illustrated an all metal building having sides A and B, ends C and D, and a roof E. The end C has a forward extension F located above an opening adapted to be closed by a door G. The building is supported mainly by arch-shaped trusses similar to or identical with the truss H shown in Fig. 10. It is to be understood that a plurality of such trusses are spaced at intervals lengthwise of the building.

The trusses H support a plurality of stringers such as the stringers 20, 22, 24, 26, and 28 extending lengthwise of the building. The sheet metal panels for the sides and tops, such as the panels 30, 32, 34, and 36, are attached to these stringers in any suitable manner. No attempt will be made to describe further constructional features of the building. Our invention in its various aspects is applicable not only to the building best shown in Figs. 1 and 2, but to a wide variety of buildings requiring a large door and having sufficient space above and in rear of the door opening to permit the door to be swung above and rearwardly of such opening in the manner to be hereinafter described.

The particular building shown in Figs. 1 and 2 is designed as an aircraft hangar and the forward extension F extends the longitudinal central portion of the building so that it will accommodate a longer aircraft than would otherwise be possible. The door G in this particular embodiment of our invention is designed to provide a lower continuation of such extension when in the closed position, and accordingly is provided with a forwardly extending central portion 38 and rearwardly located side portions 40. The central portion 38 is connected to the side portions 40 by intermediate portions 42 lying in planes parallel to the central longitudinal axis of the building. From Fig. 2 it will be apparent that the central portion 38 of the door is higher than the side portions 40 and in this respect the door conforms in shape to that of the opening which it is designed to close.

The door G is supported on four tracks 44, 46, 48, and 50 (Fig. 1) which are arranged in two pairs, each pair being located immediately in rear of one of the lower side portions of the door opening, as most clearly shown in Fig. 3. These tracks may be supported in any suitable manner, but in the particular embodiment shown, the tracks 44 and 50 are parts of connecting members attached at their opposite ends to upright trusses of the building frame, whereas tracks 46 and 48 are supported solely at their rear ends by members 52 and 54 extending upwardly and attached to overhead portions of the arch-shaped trusses H.

In Fig. 3 we have shown a torque tube 56 attached to the rearward portion of a side panel 40 of the door, it being understood that a torque tube of this kind is attached to each of the side panels. A pair of quadrants 58 and 60 is attached to each torque tube 56, such quadrants having arcuate surfaces engaging and rolling on the tracks 44 and 46, as clearly indicated in Fig. 4. In this particular embodiment of our invention, each of the tracks comprises a pair of side members 62 and 64 acting as guides to prevent lateral displacement of the quadrants which roll on plates or beams 66.

As clearly shown in Fig. 3, the track-engaging faces of the quadrants are of U-shaped cross section and receive the intermediate portions of a pair of cables 68 and 70. An end 72 of the cable 68 is attached to the forward end of the track, whereas an end of the cable 70 is attached to the rearward end of the track, as indicated at 74. The other ends of the cables are attached to the quadrant, as indicated most clearly in Fig. 13. The function of these cables is to prevent sliding of the quadrants along the tracks as a result of wind forces or other forces acting upon the door. Such cables permit a purely rolling relationship between the quadrants and tracks and maintain at all times the predetermined relationships between the door opening and various positions assumed by the door.

An arm 76 is attached to an end of each torque tube 56 and carries a counterbalancing weight 78 pivotally attached at the end remote from the torque tube 56. The counterweights 78 are preferably, but not necessarily, formed of concrete or other relatively inexpensive and readily available material. Each counterweight is preferably provided with a ground-engaging pulley 80 for a purpose hereinafter described.

It will be noted from Fig. 4 that the center of gravity of the door, the center of rotation (which is also the axis of the torque tubes), and the pivot point for the counterbalancing weights, are in a straight line. It will be understood, of course, that, in order to attain this straight line relationship, due compensation is provided for any twisting in the torque tubes and any deflection in the arms 76 connecting the counterweights 78 thereto. In order to secure proper balancing of the door, it is also important that the distance of the center of gravity of the door from the center of rotation multiplied by the weight of the door equals the product of the combined weight of the two counterweights 78 multiplied by the distance between the center of rotation and the pivotal axis of the counterweights. It is also important that the center of rotation of the door lies in or closely adjacent to the horizontal plane passing through the center line of wind balance for the door.

The door is moved between open and closed position by a pair of carriers located above the door opening and at equal distances on opposite sides of the center line of the building. In the particular embodiment shown, each carrier is attached to the upper edge of the door at the point indicated by reference character 82 in the left-hand half of Fig. 2. This point of engagement is located at hte angle formed where the inclined panel 84 joins the strictly transverse panel 86 in the projecting section of the door. Referring to Figs. 5, 9, and 10, it will be seen that a pair of carrier tracks 88 are suspended from the upper portions of the arch-shaped trusses H and extend lengthwise of the building on opposite sides of the center line thereof. Referring to Fig. 7, it will be seen that each carrier track 88 provides a pair of oppositely disposed channels receiving the carrier rollers 90. Each carrier includes a horizontal arm 92, a vertical arm 94, and a diagonal brace 96, and is suspended from its carrier rail by straps 98 depending from the track-engaging rollers 90. The vertical arm 94 of each carrier forms a trackway for a trolley 100, best shown in Fig. 8. Each trolley has arm-engaging rollers 102 corresponding to rollers 90 and is pivotally attached at 104 to the upper edge of the door G.

Each carrier is moved lengthwise of its track or rail 88 by a chain 106 whose ends are attached to its carrier as indicated at 108 and 110. Each chain 106 passes around an idler sprocket wheel 112 at the forward end of its rail 88 and a driving sprocket wheel 114 at the rear end of its rail. The driving sprocket wheels 114 drive the chains 106, carriers, and door G positively in both directions. As the door moves between the closed position shown in full lines in Fig. 5 to the open position shown in dotted lines in that figure, the upper edge of the door moves in the path indicated by the dot and dash line 116. As the door traverses this path or trajectory, the carriers move lengthwise of their rails 88 and the trolleys 100 move up and down on the carrier rails 94, and thereby perfectly compensate for the irregular pathway travelled by the upper edge of the door as it moves between its two extreme positions.

Referring to Fig. 9, it will be seen that the driving sprocket wheels 114 are attached to a transverse shaft 117 which is preferably composed of sections connected by couplings 118. The shaft 117 has a bevel gear 120 attached to one end thereof, the gear being located in a housing 122 also containing a pinion 124 for driving the gear 120 and shaft 117. Pinion 124 is on a stub shaft 126 projecting through a wall of the housing 122 and carrying a sprocket wheel 128. The housing 122 and box-like frames 130 carrying the shaft 117 are mounted on a crosspiece 132 attached at its ends to an arch-shaped truss H, as indicated at 134 in Fig. 10.

The sprocket 128 on the stub shaft 126 is driven by a main driving chain 136 (Fig. 10) which in turn is driven by a relatively small sprocket wheel 138 forming part of an assembly attached to a lower end of one of the arch-shaped trusses H and shown more fully in Figs. 11 and 12. This assembly includes means for operating the door either by hand or electric motor, and also incorporates safety and protective features hereinafter described as well as a braking means for holding the door in any desired position.

Sprocket wheel 138 is attached to a shaft 140 which passes through a gear housing 142 containing a large gear 144 attached to the shaft 140 and a smaller and intermeshing gear 146 on a shaft 148 carrying a pulley or sheave 150. A belt 152 connects the sheave 150 with a sheave 154 attached to a hub-like extension of the housing 156 of a hydraulic coupling. This coupling comprises two sets of blades, one being attached to the housing 156 and the other to the shaft of an electric motor 158 whereby rotation of the motor in the proper direction will serve to open or close the door G through driving connections including the hydraulic coupling 156. It will be understood that suitable starting, stopping, and reversing switches (not shown) are provided for the motor 158. Because of the hydraulic coupling, overrunning of the motor has no harmful effect and it is unnecessary to have automatic controls to stop the motor before the door reaches either limit of its movement. This elimination of automatic controls and reliance on manual control is important since automatic controls are difficult to keep in accurate adjustment, particularly where the building is subjected to extreme temperature conditions.

Because of the efficient mounting, balancing, and operating mechanism, little power is required to open and close the door and it is therefore possible for a man of average strength to open and close the door quickly by turning a crank. Such a crank is indicated at 160 and has a hub 162 freely rotatable on an extension of shaft 140. This crank has a dog 164 which is normally held in retracted or disengaged position by a spring 166 but which can be pushed by hand toward the left, as shown in Fig. 12, to engage one of the openings 168 in a brake drum 170 attached to the shaft 140. When the dog is so engaged, rotation of the crank 160 will effect an opening or closing movement of the door as desired. As long as rotative effort is exerted on the crank, the dog 164 will remain engaged, but as soon as such rotative effort ceases, spring 166 releases the dog from engagement with the brake drum 170. This is a safety feature which prevents the crank 160 from rotating when the motor 158 is driving the door.

A brake band 172 encircles the brake drum 170 and the ends of the brake band are attached to an operating lever 174 as clearly indicated in Fig. 11. This lever is pivoted at 176 to a framework 178 and has a ratchet adapted to engage the complementary teeth of an arcuate member 180 also mounted on the framework 178. A ratchet release button 182 is provided for the lever 174. By virtue of this brake mechansim, the door may be securely held in any desired position.

When the door is in closed position, a strip 184 (Fig. 4) of rubber or other suitable material, at the bottom of the door, engages the ground and helps to seal off the interior of the building. Similar strips 186 (Fig. 3) and 188 are provided for the sides and top edges of the door, so that a substantially perfect seal may be effected between the door and building when the door is closed. In this position, the horizontal center line of wind force acting upon the door is in the same plane as the center of rotation, so that the wind has no tendency to move the door about its axis of rotation regardless of the amount of wind pressure exerted thereon. The cables 68 and 70 prevent the door from being moved bodily in either an inward or outward direction by virtue of differences in air pressure on opposite sides of the door.

The provision of the two door operators or carriers equally spaced on opposite sides of the center line of the building distributes the opening and closing pull on the door in such manner as to eliminate any appreciable tendency to create a twist in the door itself. By thus eliminating any twisting action in the door, the construction of the door may be made lighter and such lightness contributes to the ease of door operation. Lightness in door construction and rigidity without undue weight are also contributed to by our novel manner of mounting and supporting the door.

Another important feature of our novel mounting resides in a unique relationship between the travel of the door inwardly of the building as the door moves between closed and open position and the lever arm of the force acting upon the door to move it between such positions. Such lever arm is the vertical distance between the pivotal connections of the trolleys 100 to the upper edge of the door and the tracks on which the quadrants roll. This distance is approximately two-thirds the height of the door when the door is in closed position and increases to a maximum when the door is approximately half open as indicated by line 116. By virtue of this large lever arm a relatively small force exerted on the top of the door is sufficient to move it between open and closed positions while at the same time the movement of the door backwardly into the building is not excessive due to the location of the door-supporting tracks only a short distance below the vertical center of the highest portion of the door.

As the door approaches its fully open position, rollers 80 on counterweights 78 engage the floor of the building as indicated in Fig. 4 and rotate these counterweights about their pivots in such manner as to reduce the counterweighting action. This has the dual effect of converting part of the inertia of the moving door and counterweights into rotary motion of the counterweights and also reduces the pull of these counterweights in a direction tending to continue opening movement of the door. Both of these effects facilitate stopping of the door without appreciable jar. The lower edge of the door may also be provided with spring bumpers 190 to cushion the shock when the door is moved to closed position. The spring bumpers 190 facilitate slightly the initial opening movement of the door, and the reduction in counterbalancing action occasioned by engagement of rollers 80 with the ground likewise facilitates initial closing movement of the door.

In Fig. 13 we have shown a modified form of our invention which provides an additional check against overrunning of the door in either opening or closing movement and which increases the facility with which the door may be strated in rest position at either extreme of its movement. In this form of our invention the tracks 200 on which the door-supporting segments 202 roll is formed of a plate whose opposite ends 204 and 206 may be inclined upwardly by means of bolts and nuts 208 and 210 respectively. The degree of inclination of the ends of the plate 200 may be varied as desired by adjusting the associated nut and bolt. With this construction the entire door is raised slightly as it approaches each end of its movement. Such lifting of the door absorbs part or all of the momentum and assists in preventing overrunning of the door at either extreme of its movement. Likewise the inclined ends of the track assist in initiating movement of the door from a rest position at either end of its total travel.

In Fig. 14 we have shown a further modification in which the breaking or retarding action and initial starting aid afforded by the upwardly turned track ends of the form shown in Fig. 13 are accomplished by utilization of quadrants of special design. In Fig. 14 the quadrant 212 rolls on a flat track 214. This quadrant, however, has a central sector 216 terminating in a track-engaging arc 218 and side sectors 220 and 222 terminating in flat surfaces 224 and 226 respectively which are tangent to the arc 218. In a typical installation the arc 218 may subtend an angle of 70° whereas the flat surfaces 224 and 226 may each subtend an angle of 10°.

In Figs. 15 through 19 we have shown a further modification of our invention wherein the door G' is designed to fit a rectangular opening in a building I. In this construction the door is supported on the two tracks 230 and 232 located on opposite sides of the door opening and supported from the ground instead of from the framework of the building, so that the building does not carry any of the weight of the door or its counterbalancing means. An A-shaped arm 234 is attached to each end of the door and has a counterweight 236 pivotally attached thereto, each counterweight in turn having a floor engaging roller 238 like that heretofore described. A quadrant 240 is attached to each arm 234 and rolls on one of the tracks as the door moves between its open and closed positions under the control of carriers 242 attached to the upper edge of the door as in the previous embodiments. Each of these carriers moves lengthwise of the carrier track 244 under the control of an endless chain 246, and these chains may be driven by the operating mechanism heretofore described.

In this form of our invention the tracks 230 and 232 are provided with teeth 248 adapted to be engaged by complementary teeth 250 on the quadrants 240. In order to facilitate starting of the door in each extreme position thereof and to prevent overrunning of the door past such positions, an adjustable tooth or plate 252 may be attached to each end of a quadrant in any suitable manner, such as bolts 254. By adjusting the teeth 252 so that they extend outwardly beyond the teeth 250, the quadrants and door associated therewith may be raised slightly as it approaches each limit of its movement, as indicated in Fig. 19.

The complementary teeth of the tracks and quadrants of this embodiment perform the same function as the cables of the previous embodiments in holding the door against displacement by wind or other forces exerted thereon. In lieu of having flat tracks with teeth and quadrants with projecting teeth at each extremity thereof, the same effect can be provided when utilizing a chain as a track and a quadrant having pins engaging between the links of the chain. Where such a chain is used as a track, the ends of the chain can be inclined upwardly to correspond to the upwardly inclined ends of the embodiment of Fig. 13.

In Fig. 20 we have shown a further modification of our invention having a relationship between the several parts particularly adapted for certain conditions. In this form of our invention the track surfaces 260 on which the door supporting quadrants 262 roll are in, or approximately in, a horizontal plane passing through the horizontal center line of the door 264 so that the door is balanced with respect to wind forces acting thereon, and such forces will not tend either to open or close the door.

The quadrants 262 are illustrated as having a height approximately one-quarter the height of the door so that the quadrant axis 266 is well above the horizontal center line of the door. This quadrant axis 266 is also as close to the face of the door as is reasonably possible so that the lever arm of the door mass about its point of rotation is a minimum. This permits the use of a smaller counterbalancing force permitting a shorter arm for the counterbalancing weight, or a lighter weight on the same length arm, or a combination of shorter arm and lighter weight. The location of the segment axis 266 well above the horizontal center line of the door further provides ample space between this axis and the building floor for an appropriate length of arm 268 for the counterbalancing weight 270.

As in the previous embodiments, the upper edge of the door 264 is attached to one or more trolleys 272, each of which can travel upwardly along the front edge of the carrier 274 as the carrier moves lengthwise of its rail 276 under the control of chain 278. The lever arm for opening the door is the vertical distance between this trolley and the track surface 260. In the construction shown in this Fig. 20 the lever arm is half the height of the door and this permits the door to be opened and closed quickly and easily by the application of a relatively small manual or mechanical force to the carrier chain 278.

From the foregoing it will be apparent that we have invented a light-weight and inexpensive door which is adapted for large openings and may be quickly moved between open and closed positions with a minimum of power. Furthermore, this door is capable of being balanced so that when in the closed position it is not urged toward open position by wind or other pressure differentials on opposite sides thereof. The mounting is rugged, simple, and unaffected by temperature or other weather conditions. Likewise, the operating mechanism for opening and closing movements is simple, rugged, free from complicated or delicate automatic controls, and substantially foolproof.

While we have illustrated only a few embodiments of our invention, it is to be understood that our invention may assume numerous forms, and covers all modifications, variations, and equivalents coming within the scope of the appended claims.

We claim:

1. A door construction for airplane hangars and similar buildings comprising a door, tracks for said door, an arm attached to said door, a counterweight for said door, a pivotal connection between said arm and counterweight, said door having a center of gravity, and door-carrying quadrants rollable on said tracks for moving said door between open and closed positions, said quadrants having a center of rotation, said center of gravity, center of rotation and pivotal connection being substantially in a straight line.

2. A door construction for airplane hangars and similar buildings comprising a door, tracks for said door, an arm attached to said door, a counterweight for said door, a pivotal connection between said arm and counterweight, door-carrying quadrants rollable on said tracks for moving said door between open and closed positions, and a ground-engaging roller on said counterweight for partially relieving counterbalancing action of said counterweight and for converting momentum of said door into rotary movement of the counterweight as the door approaches one limit of its movement.

3. A door construction for airplane hangars and similar buildings comprising a door, a pair of tracks for each side of said door, said tracks being approximately one-third of the maximum height of the door above the lower edge of said door when the latter is in closed position, an arm attached to said door, a counterweight for said door, a pivotal connection between said arm and counterweight, said door having a center of gravity, and door-carrying quadrants rollable on said tracks for moving said door between open and closed positions, said quadrants having a center of rotation, said center of gravity, center of rotation and pivotal connection being in substantially the same plane when the door is in closed position.

4. A door construction for airplane hangars and similar buildings comprising a door having a forwardly projecting central section of maximum height and rearwardly located side sections of lesser height, a torque tube attached to and supporting each side section, a pair of quadrants attached to each torque tube and spaced lengthwise thereof, a track for each quadrant, an arm attached to an end of each torque tube, a counterweight pivotally attached to each arm, and means attached to the upper part of the central section for shifting said door between open and closed positions.

5. A door construction for airplane hangars and similar buildings comprising a door having a forwardly projecting central portion of maximum height and rearwardly located side sections of lesser height, a torque tube attached to each side section, a pair of quadrants attached to each torque tube and spaced lengthwise thereof, a track for each quadrant, an arm attached to an end of each torque tube, a counterweight pivotally attached to each arm, a pair of rails above the door opening and extending rearwardly thereof, said rails being equally spaced on opposite sides of a center line of said opening, a carrier movable lengthwise of each rail, means for moving said carriers along said rails, a vertical arm provided by each carrier, a trolley vertically movable on each carrier arm, and a pivotal connection between each trolley and the upper edge of the central portion of said door.

6. A door construction for airplane hangars and similar buildings comprising a door, a torque tube attached to said door, a pair of quadrants attached to said torque tube with the centers of curvature of said quadrants substantially coinciding with the axial center of said torque tube, a pair of tracks for said quadrants, said tracks being located a substantial distance above the bottom of the door when the latter is in closed position, supporting means for said tracks, at least one of said tracks being supported entirely from an end remote from the door opening, counterbalancing means for said door, and means for moving said door between open and closed positions.

7. A door construction for airplane hangars and similar buildings comprising a door, supporting tracks for said door, quadrants attached to said door and having surfaces engaging said tracks and adapted to roll thereon, and cables connecting each quadrant and its track to prevent slippage between said quadrants and tracks in a direction longitudinally of the latter.

8. A door construction for airplane hangars and similar buildings comprising a door, supporting tracks for said door, quadrants attached to said door and having surfaces engaging said tracks and adapted to roll thereon, and a pair of cables connecting each quadrant and track to prevent slippage between said quadrants and tracks in a direction longitudinally of the latter, one cable of each pair having an end attached to one end of a track and the other cable of such pair having an end attached to the other end of the same track.

9. A door construction for airplane hangars and similar buildings comprising a door, supporting tracks for said door, quadrants attached to said door and having surfaces engaging said tracks and adapted to roll thereon, a trolley attached to the upper edge of said door, a carrier for moving said trolley lengthwise of said tracks, means connecting said trolley and carrier and permitting said trolley to move vertically of said carrier during opening and closing movements of said door, and means for moving said carrier lengthwise of said tracks to open and close said door.

10. A door construction for airplane hangars and similar buildings comprising a door, supporting tracks for said door located in a plane approximately coinciding with the horizontal center line of said door, quadrants attached to said door and having surfaces engaging said tracks and adapted to roll thereon, said quadrants having an axis above the horizontal center line of said door, said axis being closely adjacent the outer face of said door to shorten the lever arm of the door mass about its rotating point, a counterweight for said door, a supporting arm for said counterweight, a trolley attached to the upper edge of said door, means for moving said trolley lengthwise of said tracks, and means permitting vertical movement of said trolley during its aforesaid lengthwise movement.

11. A door construction for airplane hangars and similar buildings comprising a door, supporting tracks for said door located in a plane approximately coinciding with the horizontal center line of said door, quadrants attached to said door and having surfaces engaging said tracks and adapted to roll thereon, said quadrants having an axis above the horizontal center line of said door, said axis being closely adjacent the outer face of said door to shorten the lever arm of the door mass about its rotating point, a counterweight for said door, a supporting arm for said counterweight, a pivotal connection between said arm and said counterweight, and means for moving said door between open and closed positions.

12. A door construction comprising a door movable between a substantially vertical closed position and a substantially horizontal open position, a pair of quadrants fixed to said door, a pair of tracks for said quadrants, a carrier mounted above the upper edge of said door for substantially horizontal movement toward and away from the door, a vertical track carried by said carrier, and means forming a pivotal connection between said vertical track and the upper edge of said door, said means moving vertically along said track as said carrier moves toward and away from said door.

13. A door construction comprising a door, a torque tube attached to said door, a pair of quadrants attached to said torque tube, a pair of tracks for said quadrants, an arm fixed to said torque tube, a counterweight pivotally attached to said arm, a substantially horizontal rail extending rearwardly of said door and located above the upper edge thereof, a carrier movable lengthwise of said rail, a vertical arm carried by said carrier, a trolley vertically movable on said carrier arm, and a pivotal connection between said trolley and the upper edge of said door.

14. A door construction comprising a door, supporting tracks therefor, quadrants attached to said door adjacent opposite sides thereof, said quadrants having surfaces engaging said tracks and adapted to roll thereon as the door is shifted between open and closed positions, a substantially horizontal rail extending rearwardly of said door and located above the upper edge thereof, a carrier movable lengthwise of said rail, a vertical arm carried by said carrier, a trolley vertically movable on said carrier arm, a pivotal connection between said trolley and the upper edge of said door, an endless chain for moving said carrier along said rail, means for driving said chain including a hand crank, a motor, means for automatically disconnecting said hand crank when said motor is operated, and a brake associated with said driving means for holding the door in any desired position.

15. The door construction set forth in claim 14, wherein means is provided for raising said door as it approaches each limit of travel.

16. The door construction set forth in claim 14, wherein said driving means includes a slippable connection to protect against over-operation of said motor.

17. A door construction comprising a door movable between a substantially vertical closed position and a substantially horizontal open position, a pair of quadrants fixed to said door, a pair of tracks for said quadrants, a substantially horizontal rail extending rearwardly of said door and located above the upper edge thereof, a carrier movable lengthwise of said rail, a vertical arm carried by said carrier, a trolley vertically movable on said carrier arm, a pivotal connection between said trolley and the upper edge of said door, an endless chain for moving said carrier along said rail, and means for driving said chain comprising a motor, a fluid clutch driven therefrom, reduction gearing driven through said fluid clutch, a shaft driven by said gearing, a hand crank freely rotatable on said shaft, a brake drum attached to said shaft, a brake for cooperation with said drum to lock said door in any desired position, said drum having a laterally extending opening, means on said crank for engaging said opening to establish a driving relationship between said crank and shaft, and automatic release means for such driving connection.

18. In a door construction including a door, quadrants on which the door is adapted to move between open and closed positions, tracks for the quadrants, counterbalancing means for the door, and means for moving the door between open and closed positions, the improvement wherein the quadrants and tracks are formed to elevate the door and said counterbalance means as the door approaches but before it reaches its extreme open and closed positions to oppose the tendency of the door to overrun.

19. In a door construction including a door, quadrants on which the door is adapted to move between open and closed positions, tracks for the quadrants, counterbalancing means for the door, and means for moving the door between open and closed positions, the improvement wherein the tendency of the door to be displaced longitudinally of the tracks by wind or the like is opposed by providing the surfaces of the quadrants and the tracks that are adapted to engage each other with complementary teeth, and in which the quadrants have lugs at the ends thereof projecting radially beyond the teeth of the quadrants to elevate the door and said counterbalancing means as the door approaches but before it reaches its extreme open and closed positions to oppose the tendency of the door to overrun.

References Cited in the file of this patent

UNITED STATES PATENTS

| Number | Name | Date |
|---|---|---|
| 1,962,475 | Blodgett | June 12, 1934 |
| 2,388,182 | Redding et al. | Oct. 30, 1945 |
| 2,476,755 | Morgan | July 19, 1949 |
| 2,532,456 | Merritt | Dec. 5, 1950 |
| 2,580,311 | Matchett | Dec. 25, 1951 |

FOREIGN PATENTS

| Number | Country | Date |
|---|---|---|
| 162,395 | Switzerland | Aug. 16, 1933 |
| 414,978 | Great Britain | Aug. 16, 1934 |
| 694,448 | Germany | Aug. 1, 1940 |